Aug. 9, 1938.   P. GOEBELS   2,125,913
METHOD AND APPARATUS FOR MIXING FINELY DIVIDED MATERIAL
Filed March 4, 1936   2 Sheets-Sheet 2
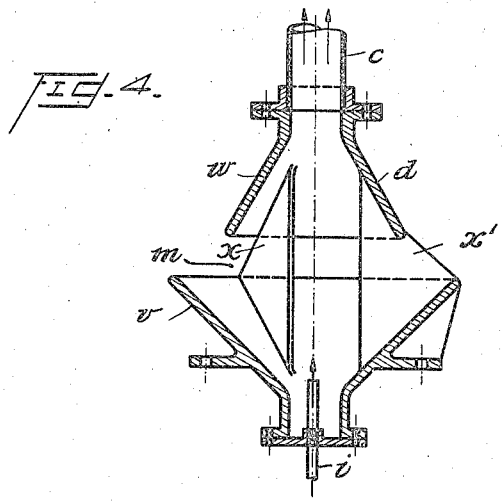
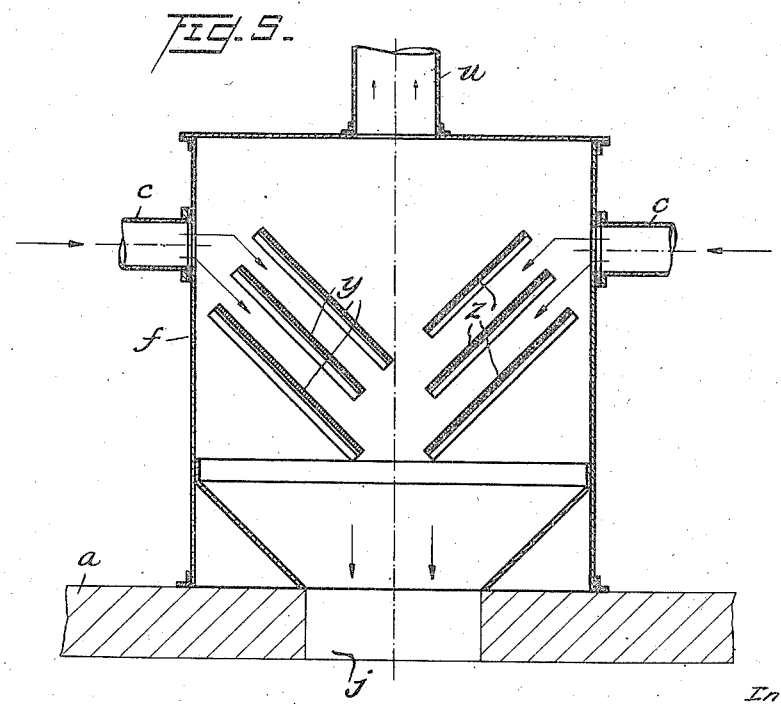

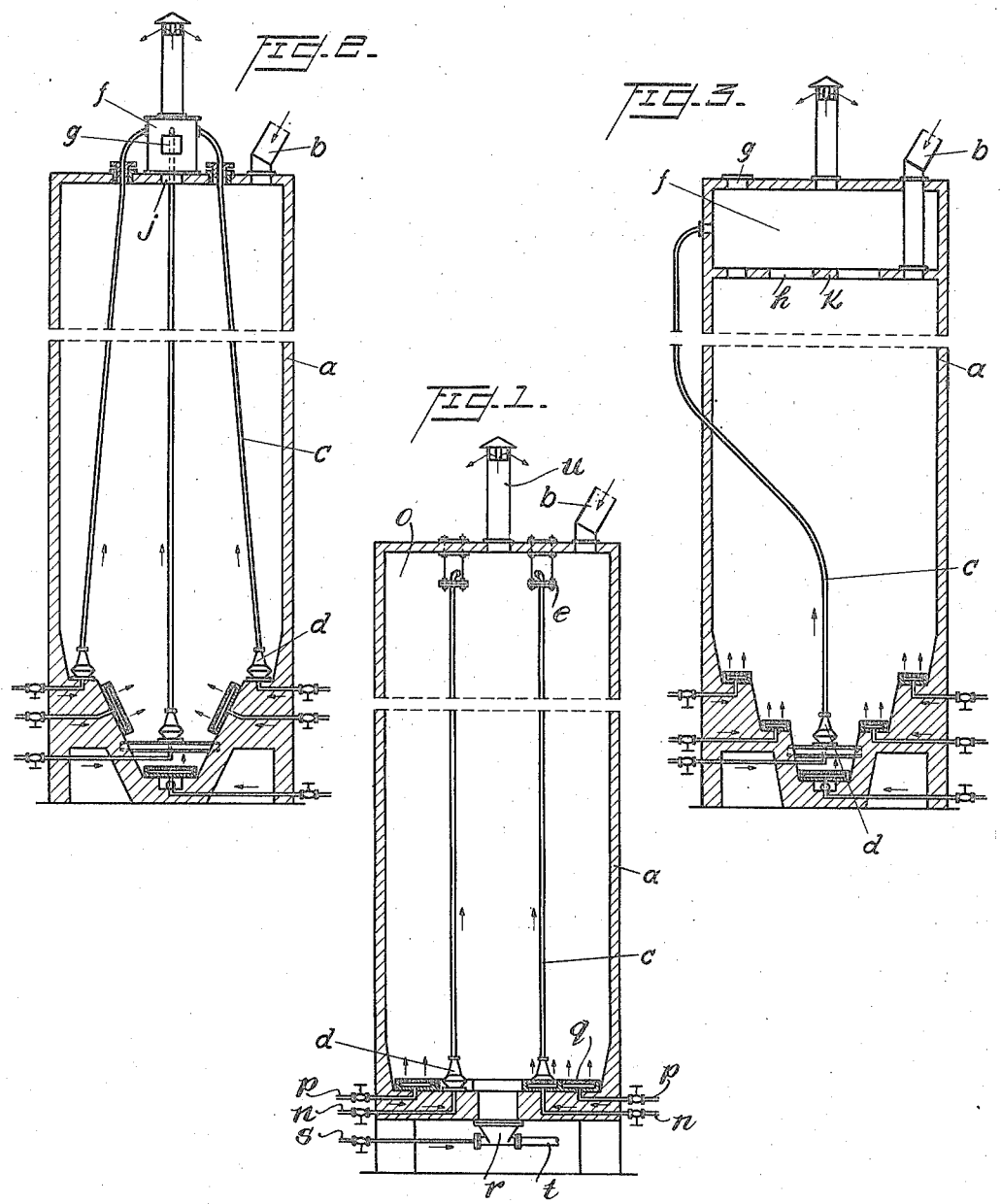

Patented Aug. 9, 1938

2,125,913

UNITED STATES PATENT OFFICE 2,125,913

METHOD AND APPARATUS FOR MIXING FINELY DIVIDED MATERIAL

Paul Goebels, Dessau, Germany

Application March 4, 1936, Serial No. 67,128

7 Claims. (Cl. 259—4)

This invention relates to the storage, handling, and mixing of finely divided material, for instance cement, coal dust, or farinaceous material, and it is the principal object of the invention to provide a new and improved method of effecting a complete and homogeneous mixture of pulverulent material of different character or density and to provide apparatus suitable for carrying out the method.

It has heretofore been proposed to effect the mixing of finely divided materials by aeration, the material being introduced into a storage bin or other container into which compressed gas, for instance air, is admitted, it being recognized that mixing is facilitated if the solid particles of the material are thus converted into a state which is analogous to the liquid form. Mechanical mixing devices, such as agitators or the like, have been employed for the mixing of materials thus aerated. It has also been proposed heretofore to withdraw finely divided material from a storage container and to subsequently return the material to the same container in order to effect thorough mixing. These various processes which have been resorted to in the past have not, however, proven very successful in practical use. The apparatus of the prior art is quite cumbersome and expensive and it is almost impossible to secure by the use of such apparatus a thorough mixing of pulverulent material which is of such a nature that it tends to stratify within the storage container.

It is therefore proposed as a part of the present invention to more effectively mix finely divided material by circulation thereof within a storage container, preferably by aspirating and conveying the material to a mixing zone, the material being drawn from different strata in the container and thus circulated in intimate contact. During the aspiration, conveying, and circulation of the material, the latter is maintained in a substantially fluid condition so that an essentially homogeneous mixture can be obtained and the mixing facilitated.

The apparatus for carrying out this method may comprise a storage container having upwardly directed conduits therein, each conduit having at its lower end an aspirating nozzle into which gas under pressure may be directed, the nozzle being located below the upper level of material in the container, these conduits discharging at an upper point into a common mixing zone, for instance in the upper portion of the container, the material being subsequently returned to the main portion of the container. In one form of the invention the mixing zone is located outside of and above the container and is provided with means whereby the mixing operation may be directly observed. By the provision of a separate mixing zone, preferably isolated from the principal portion of the storage container, the particles of material can be brought into more intimate contact by reason of the confined nature of the mixing zone and may be so discharged into the mixing zone that they directly and forcibly impinge on each other. This construction also assists in the formation in the mixing zone of eddying currents which substantially improve the mixing action.

It is a further feature of the invention that means are associated with the storage container to facilitate the maintenance of the material therein in substantially the equivalent of a fluid state. Thus the portions of the container walls disposed adjacent the aspirating nozzles may be so constructed as to establish a layer of gas or air thereover which prevents the accumulation of the material on the walls and the resulting compacting of the particles of the material and destruction of the desired condition of fluidity.

Further objects and features of the invention will be apparent from the following description taken in connection with the accompanying drawings, in which Figure 1 is a vertical sectional view of a storage container constructed in accordance with the principles of the invention;

Figures 2 and 3 are similar views of storage containers illustrating slightly modified constructional forms;

Figure 4 is an enlarged sectional view of an aspirating nozzle suitable for use with any of the embodiments of the invention herein described; and Figure 5 is a vertical sectional view of a chamber affording a mixing zone suitable for use with the construction shown in Figure 2.

In order to facilitate an understanding of the invention, reference is made to the several embodiments thereof illustrated in the accompanying drawings, and specific language is employed. It will nevertheless be understood that no limitation of the scope of the invention is thereby contemplated and that various alterations and further modifications may be made such as would occur to one skilled in the art to which the invention relates.

Referring first to Figure 1 of the drawings, it will be observed that the storage container $a$ is provided with an inlet opening $b$ through which pulverulent materials of different character or density may be introduced, it being intended that the container shall receive a substantial quantity of these materials prior to the mixing operation. Located within the container are a plurality of generally upstanding conduits c which may be suitably supported as indicated at e adjacent the upper open ends thereof. At the lower end of each conduit c an aspirating nozzle d is provided the details of this nozzle being shown more particularly in Figure 4 of the drawings. Thus each nozzle may comprise an enlarged outer casing with which the lower end of the associated conduit c communicates, the casing being provided with a plurality of circumferentially spaced openings m permitting the entry of the pulverulent material into the casing. A conduit n connected with a source of air or other gas under pressure extends through the wall of the container a and upwardly within the casing of the nozzle d. It will be appreciated that with this construction an aspirating effect is secured, the material being drawn into the nozzle through the openings m and directed upwardly through the associated conduits c from which it is discharged into a mixing zone o in the upper portion of the container a.

The portions of the container walls a adjacent the several aspirating nozzles d are preferably provided with means for maintaining a thin film or blanket of air or other gas thereon, the air being admitted under pressure through the conduits p and passing into the container through inner walls or linings q which are perforated at closely spaced intervals or are otherwise so constructed as to be pervious to gas. For instance, the employment of inner linings q of gas pervious material such as filter stone, porous brick, porous caoutchouc, or any other material having a multiplicity of perforations or openings therein is found effective. It is to be understood that no blast or jet of air is produced by this arrangement. On the contrary, the infiltration of air through the gas pervious lining is effected at such a large number of points and at such a low rate of flow as to establish the desired film or blanket of gas on the inner surface thereof, whereby adherence of the material to this surface is prevented and the material is permitted to move freely, thus simulating a fluid condition to facilitate aspiration thereof.

When the mixing has been completed, the homogeneous material may be withdrawn through the outlet r, the discharge being preferably facilitated by aspiration of the material through the employment of a conduit s containing air or other gas under pressure, the material being thus forced to flow outwardly in the passage t. A ventilating stack u is preferably provided at the upper end of the container a to prevent the development of excessive pressures within the container.

In the form of the invention illustrated in Figure 2, the aspirating nozzles d are shown as occupying different levels so as to communicate with different strata of material within the container. This arrangement avoids the difficulty heretofore experienced of ensuring intimate mixing of materials of different density which tend to stratify, or of materials which have been mechanically stratified by successive introduction into the container a.

It will also be observed that in this form of the invention each of the conduits c is extended upwardly and through the upper end of the container, being thence directed into a chamber f which affords a mixing zone of relatively small volume to promote intimate contact of the particles from the different strata of material. As the result of the employment of a small mixing zone, the different particles of material therein are forcibly impinged on one another to further facilitate the intimate mixing thereof. During the mixing operation, material is continually discharged downwardly through the opening j which affords communication between the chamber f and the container a to return the mixed material to the latter. The chamber f is also preferably provided with means whereby the mixing operation may be directly observed, for instance by the provision of a transparent window or peephole g. Thus if any of the conduits c become clogged or for any reason material is not being properly conveyed therethrough, the defect will be at once noted and can be more readily corrected.

Figure 3 of the drawings illustrates a further modification in which the mixing zone or chamber f is formed as a part of the container a by the provision of a partition k which divides the container into a material collecting zone and a relatively restricted mixing zone, the partition k being apertured as at h to permit the discharge of mixed material from the mixing zone f and the return thereof to the main portion of the container a. The construction shown in Figure 3 is further simplified by extension of the conduit c outwardly through the walls of the container a, these conduits entering the mixing chamber f through the peripheral wall thereof.

Figure 5 of the drawings illustrates details of the preferred form of mixing chamber shown at f in Figure 2, this chamber being preferably of generally cylindrical shape and having disposed therein a plurality of substantially parallel baffle plates y arranged at one side of the chamber and forming one series and a second similar series of parallel baffle plates z at the other side of the chamber. The plates y and z may be arranged in staggered relation with respect to each other so that, as indicated in the drawings, material impinging on plate z will be deflected toward the adjacent plate y, and thence to the second plate z in the opposite series and so on. The material-laden air enters the chamber f at points spaced circumferentially thereof through the conduits c. The material being discharged downwardly through the opening j in the upper end of the container a. Excess pressure developing within the system is relieved by discharge of gas through the stack u. It will be appreciated that the use of other forms of mixing chamber having a different arrangement of baffles therein is contemplated.

A suitable form of aspirating nozzle d is illustrated in Figure 4, the nozzle shown therein being preferably formed as an integral casting having a lower, upwardly flared, generally conical portion v and an upper, downwardly flared, generally conical portion w, these two portions being united by webs x, x'. Air under pressure is delivered into the lower end of the nozzle through an aspirating pipe i, the portion w of the nozzle communicating with the conduit c through which the material is delivered into the mixing chamber f or the upper portion of the container a. This type of nozzle has been found particularly effective for the purpose, the material entering freely between the two conical portions of the nozzle and being discharged upwardly with considerable force by the aspirating action.

The action of the aspirating nozzles $d$ and the conduits $c$ is continuous, the material being circulated in a generally upward direction through the conduits, effectively contacted in the mixing zone, and returned to the container proper for further circulation, the operation being repeated until the mixing is completed to the desired extent.

It will be observed that in all of the forms of the invention illustrated the establishment of a substantially fluid condition of the aspirated material is effected by the provision adjacent the points of aspiration of means for maintaining a film or blanket of air or other gas on sections of the inner surface of the container $a$. It is also contemplated that baffles of a suitable nature may be employed in the mixing zone in any of the embodiments of the invention, these baffles being so positioned as to direct the particles of the material into more intimate contact.

The construction herein illustrated avoids the employment of mechanical agitating means and thereby eliminates moving parts which are particularly subject to excessive wear in apparatus of this character. The cost of construction and operation is reduced to a minimum and defective operation can be readily observed and corrected. Furthermore, the mixing is so intimately effected that materials of widely varying density and character may be readily formed into a substantially homogeneous mass.

Having thus described the invention, what is claimed as new and desired to be secured by Letters Patent is:

1. In apparatus for the mixing of pulverulent material, the combination with a container having an inlet for the material to be mixed and a discharge outlet, of a mixing zone, means extending to a plurality of different levels in the container for removing material from the strata adjacent each level and conveying the same to said mixing zone, means whereby said material may be returned to said container from said mixing zone, and means for establishing a blanket of gas on portions of said container wall adjacent the said different strata of material to maintain the material about to be thus conveyed in a state of substantial fluidity.

2. In apparatus for the mixing of pulverulent material, the combination with a container having an inlet for the material to be mixed and a discharge outlet, of a mixing zone, means extending to a plurality of different levels in the container for removing material from the strata adjacent each level and conveying the same to said mixing zone, means whereby said material may be returned to said container from said mixing zone, and means for establishing a blanket of gas on portions of said container wall adjacent the said different strata of material to maintain the material about to be thus conveyed in a state of substantial fluidity, said mixing zone being relatively restricted in volume and at least partially isolated from the main portion of said container.

3. In apparatus for the mixing of pulverulent material, the combination with a container having an inlet for the material to be mixed and a discharge outlet, of a mixing zone, aspirating means extending to a plurality of different levels in the container for removing material from the strata adjacent each level and conveying the same to said mixing zone, and means whereby said material may be returned to said container from said mixing zone, said mixing zone comprising a separate chamber disposed above said container.

4. A process for the mixing of finely divided solid materials which comprises the steps of assembling materials of different character in a heterogeneous mass, separately and continuously aspirating the material in different strata of the mass and conveying the aspirated material to a mixing zone, intimately contacting and forcibly impinging together the particles of material from different strata in the mixing zone, returning the mixing material from the mixing zone to the initial mass for further circulation, and maintaining the material adjacent the points of aspiration in a state of substantial fluidity.

5. In apparatus for the mixing of finely divided solid materials, the combination with a container for the material constructed to afford a separate and relatively restricted mixing zone, of means extending into the material in the container and below the upper level thereof for withdrawing material from a plurality of vertically spaced points and commingling the material in the mixing zone, and means associated with the container adjacent the said spaced points for maintaining a gas blanket on portions of the inner surface of the container.

6. In apparatus for the mixing of finely divided solid materials, the combination with a container for the material constructed to afford a separate and relatively restricted mixing zone, of means extending into the material in the container and below the upper level thereof for withdrawing material from a plurality of vertically spaced points and commingling the material in the mixing zone, and means associated with the container adjacent the said spaced points for maintaining a gas blanket on portions of the inner surface of the container, said last named means comprising container wall linings of porous material, and devices for forcing gas through said linings.

7. In apparatus for the mixing of pulverulent material, the combination with a container having an inlet for the material to be mixed and a discharge outlet, of a mixing zone, means extending to a plurality of different levels in the container for removing material from the strata adjacent each level and conveying the same to said mixing zone, means whereby said material may be returned to said container from said mixing zone, means for establishing a blanket of gas on portions of said container wall adjacent the said different layers of material to maintain the material about to be thus conveyed in a state of substantial fluidity, and baffle means disposed in said mixing zone and positioned to cause eddying of material therein.

PAUL GOEBELS.